(12) United States Patent
Cheung et al.

(10) Patent No.: US 10,555,024 B2
(45) Date of Patent: Feb. 4, 2020

(54) GENERATING A FEED OF CONTENT FOR PRESENTATION BY A CLIENT DEVICE TO USERS IDENTIFIED IN VIDEO DATA CAPTURED BY THE CLIENT DEVICE

(71) Applicant: Facebook, Inc., Menlo Park, CA (US)

(72) Inventors: Vincent Charles Cheung, San Carlos, CA (US); Olivier Sebastien Joseph Bartholot, San Francisco, CA (US); Girish Patangay, Los Altos, CA (US); Viresh Rustagi, Palo Alto, CA (US); Sergiu Dogaru, Mountain View, CA (US); James Glessal Pearce, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/153,669

(22) Filed: Oct. 5, 2018

(65) Prior Publication Data

US 2019/0208248 A1    Jul. 4, 2019

Related U.S. Application Data

(60) Provisional application No. 62/611,566, filed on Dec. 29, 2017.

(51) Int. Cl.
*H04N 21/2668* (2011.01)
*H04N 21/4223* (2011.01)
(Continued)

(52) U.S. Cl.
CPC ..... *H04N 21/2668* (2013.01); *H04N 21/4223* (2013.01); *H04N 21/437* (2013.01); *H04N 21/441* (2013.01); *H04N 21/44222* (2013.01); *H04N 21/458* (2013.01); *H04N 21/4532* (2013.01); *H04N 21/4627* (2013.01); *H04N 21/4826* (2013.01); *H04N 21/8126* (2013.01)

(58) Field of Classification Search
None
See application file for complete search history.

(56) References Cited

U.S. PATENT DOCUMENTS 10,205,988 B1 *   2/2019   Waterman .......... H04N 21/4325
2012/0072493 A1   3/2012   Muriello et al.
(Continued)

OTHER PUBLICATIONS

PCT International Search Report and Written Opinion, PCT Application No. PCT/US2018/067770, dated Apr. 25, 2019, 15 pages.

*Primary Examiner* — Omar S Parra
(74) *Attorney, Agent, or Firm* — Fenwick & West LLP

(57) ABSTRACT

A client device includes a display device and one or more image capture devices configured to capture video data of a local area surrounding the client device. Different users of an online system are identified from the captured video data, provided privacy settings maintained for the users authorize their identification from the video data, and the client device transmits a request for content to the online system that identifies each of the identified users. The client device receives content items selected for each of the identified users from the online system. From the received content items, the client device generates a feed of content that includes at least one content item selected for each of the identified users and presents the generated feed of content via the display device.

22 Claims, 4 Drawing Sheets

(51) Int. Cl.
*H04N 21/441* (2011.01)
*H04N 21/458* (2011.01)
*H04N 21/442* (2011.01)
*H04N 21/482* (2011.01)
*H04N 21/437* (2011.01)
*H04N 21/45* (2011.01)
*H04N 21/4627* (2011.01)
*H04N 21/81* (2011.01)

(56) References Cited

U.S. PATENT DOCUMENTS

| | | |
|---|---|---|
| 2012/0209907 A1 | 8/2012 | Andrews et al. |
| 2013/0304817 A1* | 11/2013 | Hu .................. H04N 21/41407 709/204 |
| 2014/0294257 A1 | 10/2014 | Tussy |
| 2015/0169744 A1 | 6/2015 | Walkingshaw et al. |
| 2016/0092939 A1* | 3/2016 | Beattie, Jr. ............ H04L 65/605 705/14.66 |
| 2017/0185254 A1 | 6/2017 | Zeng et al. |

* cited by examiner

GENERATING A FEED OF CONTENT FOR PRESENTATION BY A CLIENT DEVICE TO USERS IDENTIFIED IN VIDEO DATA CAPTURED BY THE CLIENT DEVICE

CROSS-REFERENCE TO RELATED APPLICATIONS

This application claims the benefit of U.S. Provisional Application No. 62/611,566, filed Dec. 29, 2017, which is incorporated by reference in its entirety.

BACKGROUND

This disclosure relates generally to presenting a feed of content comprising one or more content items for display by a client device with captured video data.

Client devices and online systems exchange large amounts of content with each other pertaining to various users of each. For example, an online system shares content to client devices associated with users of the online system for presentation to the users of the online system. However, conventional client devices often inefficiently identify users to an online system, causing the online system to provide the client devices with content that is less relevant to the users of the client device. Traditional methods for client devices to identify users prompt users to periodically provide authentication information to a client device. Providing authentication information to a client device may become burdensome to a user, decreasing interaction with the client device by the user. While client devices may allow a user to store authentication information rather than prompting the user for authentication information, such a configuration increases a likelihood of a client device presenting content users other than the user without the user's consent. For example, if a client device is shared by multiple users, the client device may present content for a user whose authentication information is stored by the client device to an alternative user of the client device. The preceding scenarios may decrease user interaction with content presented by client devices.

SUMMARY

A client device includes one or more image capture devices and a display device. An image capture device included in the client device captures video data or image data of a local area surrounding the client device that is within a field of view of the imaging device. In various embodiments, the client device applies one or more machine learned models to characteristics of the video data or the image data captured by the image capture device to locate people included in the captured video data. In various embodiments, the client device includes a controller coupled to the image capture device that applies one or more methods to locate people within the captured video data. The client device may use any suitable model or combination of models to locate people within video data captured by the image capture device. Models applied by the client device to captured video data may perform facial tracking (in two-dimensions or in three-dimensions), two-dimensional pose tracking, three-dimensional pose tracking, or any other suitable method to identify portions of a person's face or portions of the person's body.

The client device identifies a user of the online system and an additional user of the online system from the people identified within the captured video data, subject to privacy settings maintained by the client device for the user and for the additional user. Additionally, subject to privacy settings maintained by the client device for the user and for the additional user, the client device identifies the user and the additional user from audio data captured by the client device. The client device and an online system that communicates with the client device cooperatively or individually maintain and enforce one or more privacy settings for users or people identified from captured video data or other data in various embodiments. A privacy setting of a user or a person determines how particular information associated with a user or a person can be shared, and may be stored in association with information identifying the user or the person. In some embodiments, the client device retrieves privacy settings for one or more users maintained by the online system. In one embodiment, a privacy setting specifies particular information associated with a user and identifies other entities with whom the specified information may be shared. Examples of entities with which information can be shared may include other users, applications, third party systems or any entity that can potentially access the information. Examples of information that can be shared by a user include image data including the user or the person, audio data including audio captured from the user or the person, video data including the user or the person, and the like. Privacy settings maintained for a user specify whether the client device or the online system is authorized to identify the user from video data captured by the client device. In various embodiments, a privacy setting maintained by the user prevents the client device or the online system from identifying the user from captured video data unless the user manually alters the privacy setting to authorize the client device or the online system to identify the user from captured video data.

In various embodiments, the client device compares people identified from the captured video data to stored information identifying the user and the additional user, provided privacy settings maintained for the user and for the additional user authorize the client device to compare portions of the captured video data to the stored information identifying the user and identifying the additional user. If a person identified in the captured video data has at least a threshold measure of similarity to information identifying the user, the client device identifies the user as included in the captured video data. Similarly, if person identified in the captured video data has at least the threshold measure of similarity to information identifying the user, the client device identifies the additional user as included in the captured video data. In other embodiments, the client device provides information identifying people identified in the captured video data to the online system, which compares the identified people to information identifying users of the online system and identifies the user and the additional user to the client device based on the comparison. Additionally or alternatively, the client device provides captured audio data to the online system, which compares the captured audio data to information identifying users of the online system who have authorized the online system to identify the users, and identifies the user or the additional user based on the comparison. In other embodiments, the client device or the online system identifies the user or the additional user based on any suitable information (or combination of information) captured by the client device and subject to privacy settings maintained for the user and for the additional user.

Subsequently, the client device transmits a request for content to the online system that includes information identifying the user and the additional user. For example, the request includes an identifier associated with the user by the online system and an additional identifier associated with the additional user by the online system. The online system selects one or more content items for presentation to the user and one or more additional content items for presentation to the additional user and transmits the one or more content items and the one or more additional content items to the online system. From the one or more content items and the one or more additional content items, the client device generates a feed of content including at least one content item for presentation to the user and at least one additional content item for presentation to the additional user. When generating the feed of content, the client device may apply one or more stored diversity criteria describing amounts of content for presentation to the user or amounts of additional content for presentation to the additional user in the feed. Additionally, the client device may account for prior interactions with content by the user or by the additional user when generating the feed of content. Similarly, the client device may account for prior usage patterns of the client device by the user or by the additional user when generating the feed of content; for example, the client device includes one or more content items in feed of content identifying functionality of the client device that the user or that the additional have not previously used. In other embodiments, the client device maintains a setting specifying one or more criteria of content items and generates the feed to include at least a threshold amount of content items having characteristics satisfying at least a threshold amount of the specified criteria. The user or the additional user may specify the setting used by the client device in various embodiments. The generated feed is then presented on the display device to the user and to the additional user.

In various embodiments, the client device generates the feed of content to maximize interaction with the feed of content by the user and the additional user. In some embodiments, the client device retrieves one or more settings maintained for the user or for the additional user that regulates presentation of content by the client device when another person is included in the captured video data. For example, a setting maintained for the user restricts presentation of content for presentation to the user when at least one other person is included in the captured video data, and withholds content items selected for presentation to the user when the captured video data includes the additional user. Similarly, the client device may store user preferences in a user profile specifying specific time intervals when the client device is authorized to present content selected for the user or presented for the additional user. In additional embodiments, the client device stores information identifying content items or additional content items previously presented to the user or to the additional user with which the user or the additional user interacted and removes the identified content items or additional content items from a subsequently generated feed of content.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
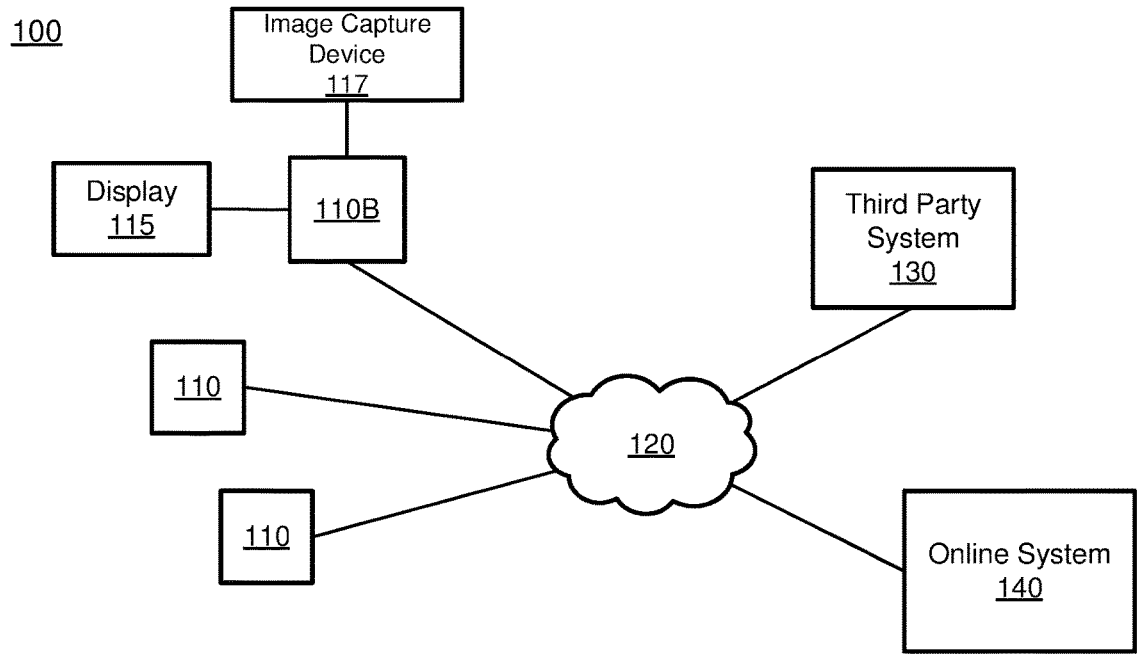
FIG. 1 is a block diagram of a system environment in which an online system operates, in accordance with an embodiment.

FIG. 1 is a block diagram of a system environment 100 for an online system 140 and one or more client devices 110. The system environment 100 shown by FIG. 1 comprises one or more client devices 110, a network 120, one or more third-party systems 130, and the online system 140. Additionally, in the system environment 100 shown by FIG. 1, a controller 117 is coupled to a client device 110. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. As further described below in conjunction with FIG. 2, a client device 110 includes a display device 115 configured to present content, and one or more image capture devices configured to capture image or video data of a local area surrounding the client device 110.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 3. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
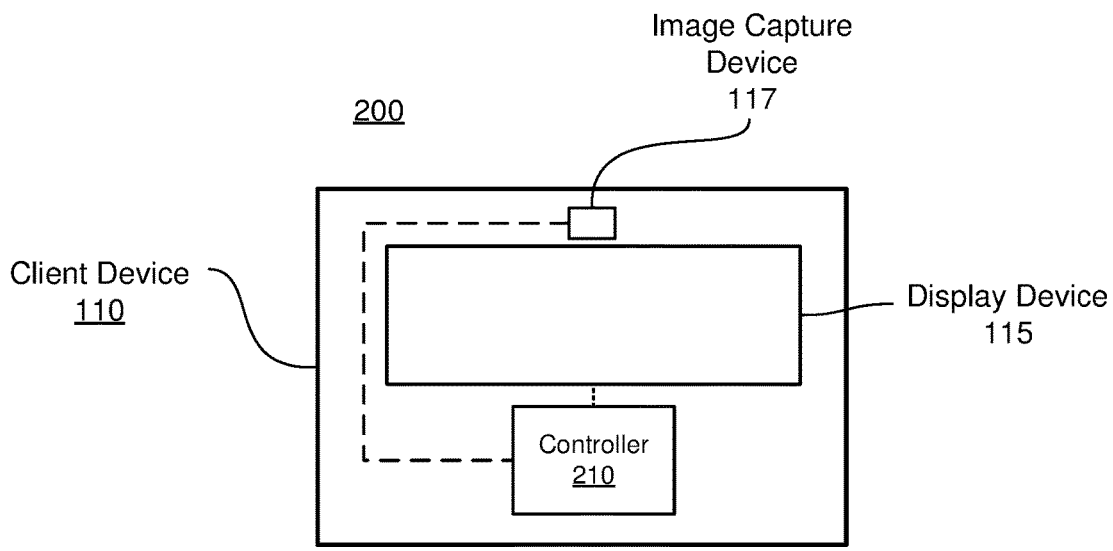
FIG. 2 is a block diagram of a client device, in accordance with an embodiment.

FIG. 2 is a block diagram 200 of an embodiment of a client device 110. In the embodiment shown in FIG. 2, the client device 110 includes a display device 115 and an image capture device 117, as well as a controller 210. However, in other embodiments, the client device 110 includes different or additional components than those shown in FIG. 2.

The display device 115 may be integrated into the client device 110 or coupled to the client device 110. For example, a display device 115 integrated into a client device 110 is a display screen included in the client device 110. Alternatively, the display device 115 is a monitor or other display coupled to the client device 110. The display device 115 presents image data or video data to a user. Image or video data presented by the display device 115 is determined by an application executing on the client device 110. Different applications may be included on the client device 110, so execution of different applications changes the content presented by the user by the display device 115.

The image capture device 117 captures video data or images of a local area surrounding the client device 110 and within a field of view of the image capture device 117. In some embodiments, the image capture device 117 includes one or more cameras, one or more video cameras, or any other device capable of capturing image data or video data. Additionally, the image capture device 117 may include one or more filters (e.g., used to increase signal to noise ratio). Various parameters (e.g., focal length, focus, frame rate, ISO, sensor temperature, shutter speed, aperture, focal point etc.) configure capture of video data or image data by the image capture device 117. Hence, modifying one or more parameters of the image capture device 117 modifies video data or image data captured by the image capture device 117 after modification of the one or more parameters. While FIG. 2 shows a single image capture device 117 included in the client device 110, in other embodiments, the client device 110 includes any suitable number of image capture devices 117.

The controller 210 is coupled to the image capture device 117 and comprises a storage device coupled to a processor. In various embodiments, the controller 210 is also coupled to the display device 115. The controller 210 includes instructions that, when executed by the processor, apply one or more models to video data captured by the image capture device 117 subject to user-specified privacy settings, which are further described below. For example, one or more models applied to video data or image data captured by the image capture device 117 identify people or objects in the captured video data or image data, provided privacy settings obtained by the controller 210 authorize the controller 210 to identify one or more users from the captured video data or image data. As further described below in conjunction with FIG. 4, the controller 210 sends a request for content items to the online system 140 via the network 120 that identifies users of the online system 140 identified in the captured video data, subject to privacy settings maintained for various users by the online system 140 or by the controller 210. Subsequently, the controller 210 receives content items selected by the online system 140 for different users identified from the captured video data and generates a feed of content for presentation by the display device 115. As further described below in conjunction with FIG. 4, the controller 210 generates the feed of content to include content items likely to be of interest to multiple users identified in the captured video data.

The online system 140 and the controller 210 of the client device 110 cooperatively or individually maintain and enforce one or more privacy settings for users or people identified from captured video data or other data in various embodiments. A privacy setting of a user or a person determines how particular information associated with a user or a person can be shared, and may be stored in association with information identifying the user or the person. In some embodiments, the controller 210 retrieves privacy settings for one or more users maintained by the online system 140. In one embodiment, a privacy setting specifies particular information associated with a user and identifies other entities with whom the specified information may be shared. Examples of entities with which information can be shared may include other users, applications, third party systems 130 or any entity that can potentially access the information. Examples of information that can be shared by a user include image data including the user or the person, audio data including audio captured from the user or the person, video data including the user or the person, and the like.

For example, in particular embodiments, privacy settings may allow a user to specify (e.g., by opting out, by not opting in) whether the online system 140 may receive, collect, log, or store particular objects or information associated with the user for any purpose. In particular embodiments, privacy settings may allow the user to specify whether particular video capture devices, audio capture devices, applications or processes may access, store, or use particular objects or information associated with the user. The privacy settings may allow the user to opt in or opt out of having objects or information accessed, stored, or used by specific devices, applications or processes. The online system 140 may access such information to provide a particular function or service to the user, without the online system 140 having access to that information for any other purposes. Before accessing, storing, or using such objects or information, the online system may prompt the user to provide privacy settings specifying which applications or processes, if any, may access, store, or use the object or information prior to allowing any such action. As an example, and not by way of limitation, a user may transmit a message to another user via an application related to the online social network (e.g., a messaging app), and may specify privacy settings that such messages should not be stored by the online system 140.

The privacy settings maintained and enforced by the online system 140 or the controller 210 may be associated with default settings. In various embodiments, the controller 210 does not identify a user within captured video data, audio data, image data, or other data unless the controller 210 obtains a privacy setting from the user authorizing the controller 210 to identify the user. For example, a privacy setting associated with a user has a default setting preventing the controller 210 from identifying the user, so the controller 210 does not identify the user unless the user manually alters the privacy setting to allow the controller 210 to identify the user. Additionally, an alternative privacy setting regulates transmission of information from the client device 110 identifying the user to another entity (e.g., another client device 110, the online system 140, a third party system 130) in various embodiments. The alternative privacy setting has a default setting preventing transmission of information identifying the user in various embodiments, preventing the controller 210 from transmitting information identifying the user to other entities unless the user manually modifies the alternative privacy setting to authorize transmission). The controller 210 maintains the one or more privacy settings for each user identified from captured video data or other data, allowing user-specific control of transmission and identification of each user. In some embodiments, the controller 210 prompts a person to provide privacy settings when the controller 210 initially identifies the person from captured data and stores the provided privacy settings in association with information identifying the person.

In various embodiments, for the online system 140 or various components of client device 110 that have functionalities that may use, as inputs, personal or biometric information of a user for user-authentication or experience-personalization purposes, a user may opt to make use of these functionalities to enhance their experience using the device and the online system 140. As an example, and not by way of limitation, a user may voluntarily provide personal or biometric information to the online system 140. The user's privacy settings may specify that such information may be used only for particular processes, such as authentication, and further specify that such information may not be shared with any third-party or used for other processes or applications associated with the online system 140. As another example, and not by way of limitation, the online system 140 may provide a functionality for a user to provide voice-print recordings to the online system 140. As an example, and not by way of limitation, if a user wishes to utilize this function of the online social network, the user may provide a voice recording of his or her own voice to provide a status update via the online system 140. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition to use voice-operated features of the online social network), and further specify that such voice recording may not be shared with any third-party system 130 or used by other processes or applications associated with the online system 140. As another example, and not by way of limitation, the online system 140 may provide a functionality for a user to provide a reference image (e.g., a facial profile) to the online system 140. The online system 140 may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system or used by other processes or applications associated with the online system 140. Any of such restrictions on capture biometric and/or other personal data may also be applied to the client device 110.

Users may authorize the capture of data, identification of users, and/or sharing and cross-application use of user-related data in one or more ways. For example, user may pre-select various privacy settings before the users use the features of the client device 110 or take actions in the online system 140. In another case, a selection dialogue may be prompted when users first carry out an action or use a feature of the client device 110 or the online system 140 or when users have not carried out the action or used the feature for a predetermined period of time. In yet another example, the client device 110 and the online system 140 may also provide notifications to the users when certain features that require user data begin to operate or are disabled due to users' selections to allow users to make further selections through the notifications. Other suitable ways for users to make authorizations are also possible.

In some embodiments, the controller 210 obtains information maintained by the online system 140 or from one or more third party systems 130 for a user identified from captured video data, subject to privacy settings for the user. Based on video data, audio data, image data, or other data including the user previously captured by the client device 110 and the obtained information, the controller 210 may generate content for presentation to the user via the client device 110. For example, the controller 210 overlays content items from the online system 140 associated with one or more objects identified by the controller 210 from video data or image data captured by the client device 110. Alternatively, the online system 140 generates content for the user based on video data, image data, audio data, or other data including the user received from the client device 110 and information maintained by the online system 140 for the user (or obtained from one or more third party systems 130 by the online system 140) and provides the generated content to the client device 110 for presentation to the user.

Figure 3:
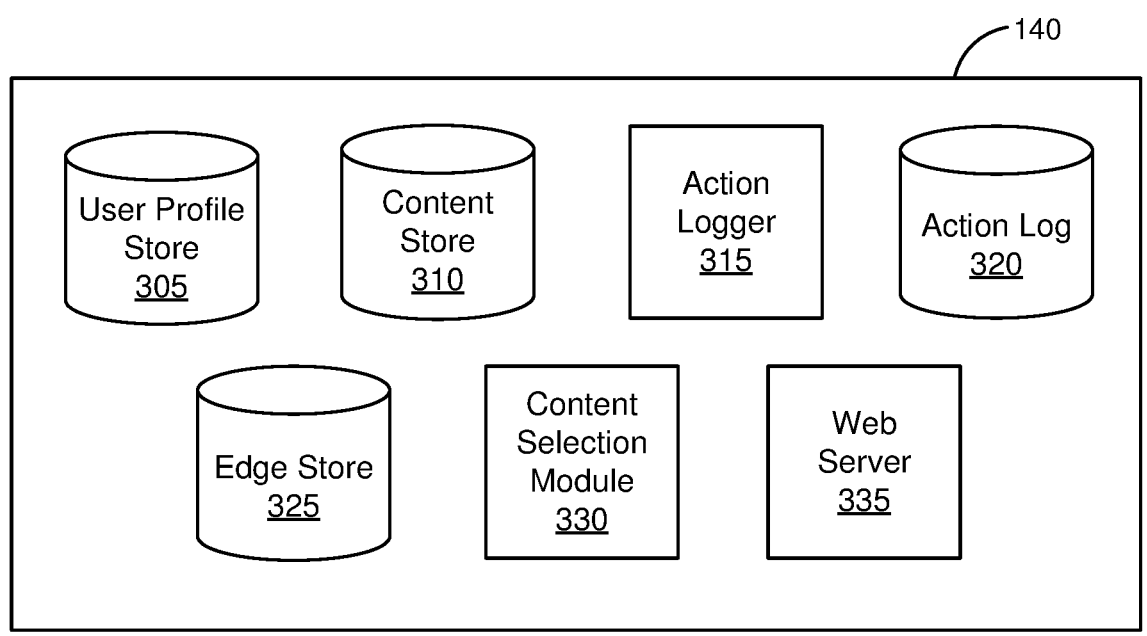
FIG. 3 is a block diagram of an online system, in accordance with an embodiment.

FIG. 3 is a block diagram of an architecture of the online system 140. The online system 140 shown in FIG. 3 includes a user profile store 305, a content store 310, an action logger 315, an action log 320, an edge store 325, a content selection module 330, and a web server 335. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 305. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 305 may also maintain references to actions by the corresponding user performed on content items in the content store 310 and stored in the action log 320.

Additionally, a user profile maintained for a user includes characteristics of one or more client devices 110 associated with the user, allowing the online system 140 to subsequently identify the user from characteristics provided by a client device 110. For example, an application associated with the online system 140 and executing on a client device 110 provides a device identifier or other information uniquely identifying the client device 110 to the online system 140 in association with a user identifier. The online system 110 stores the device identifier or other information uniquely identifying the client device 110 in the user profile maintained for the user, allowing subsequent identification of the user if the online system 140 receives the device identifier or other information uniquely identifying the client device 110. Other characteristics of client devices 110 associated with the user may be alternatively or additionally included in the user profile maintained by the user. For example, the user profile includes a network address used by a client device 110 to access a network 120, an identifier of an application executing on a client device 110 from which the online system 140 received information, a type of the client device 110 (e.g., a manufacturer, an identifier of a model of the client device 110, etc.) from which the online system 140 received information, and an operating system executing on the client device 110 from which the online system 140 received information. However, the online system 140 may store any suitable characteristics of a client device 110 in a user profile, allowing the online system 140 to maintain information about client devices 110 used by the user corresponding to the user profile.

While user profiles in the user profile store 305 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 310 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 310, such as status updates, photos tagged by users to be associated with other objects in the online system 140, events, groups or applications. In some embodiments, objects are received from third-party applications or third-party applications separate from the online system 140. In one embodiment, objects in the content store 310 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 310 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Subject to privacy settings maintained for different users, which are further described above in conjunction with FIG. 2, the action logger 315 receives communications about user actions internal to and/or external to the online system 140, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

The action log 320 may be used by the online system 140 to track user actions on the online system 140, as well as actions on third party systems 130 that communicate information to the online system 140. Users may interact with various objects on the online system 140, and information describing these interactions is stored in the action log 320. Examples of interactions with objects include: commenting on posts, sharing links, checking-in to physical locations via a client device 110, accessing content items, and any other suitable interactions. Additional examples of interactions with objects on the online system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third party system 130, such as an external website, and communicated to the online system 140, subject to the privacy settings maintained for the users. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 320 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 315 by the application for recordation and association with the user in the action log 320.

In one embodiment, the edge store 325 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

The content selection module 330 selects one or more content items for communication to a client device 110 to be presented to a user. Content items eligible for presentation to the user are retrieved from the content store 310 or from another source by the content selection module 330, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 330 includes content items eligible for presentation to the user in one or more selection processes, which identify a set of content items for presentation to the user. For example, the content selection module 330 determines measures of relevance of various content items to the user based on attributes associated with the user by the online system 140 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 330 selects content items for presentation to the user. As an additional example, the content selection module 330 selects content items having the highest measures of relevance or having at least a threshold measure of relevance for presentation to the user. Alternatively, the content selection module 330 ranks content items based on their associated measures of relevance and selects content items having the highest positions in the ranking or having at least a threshold position in the ranking for presentation to the user.

Content items eligible for presentation to the user may include content items associated with bid amounts. The content selection module 330 uses the bid amounts associated with content items when selecting content for presentation to the user. In various embodiments, the content selection module 330 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 330 may rank content items based on their associated bid amounts and select content items having at least a threshold position in the ranking for presentation to the user. In some embodiments, the content selection module 330 ranks both content items not associated with bid amounts and content items associated with bid amounts in a unified ranking based on bid amounts and measures of relevance associated with content items. Based on the unified ranking, the content selection module 330 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 330 receives a request to present a feed of content to a user of the online system 140. The feed includes content items such as stories describing actions associated with other online system users connected to the user. The content selection module 330 accesses one or more of the user profile store 305, the content store 310, the action log 320, and the edge store 325 to retrieve information about the user. For example, information describing actions associated with other users connected to the user or other data associated with users connected to the user are retrieved. Content items from the content store 310 are retrieved and analyzed by the content selection module 330 to identify candidate content items eligible for presentation to the user. For example, content items associated with users who not connected to the user or stories associated with users for whom the user has less than a threshold affinity are discarded as candidate content items. Based on various criteria, the content selection module 330 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 330 presents content to a user through a feed including a plurality of content items selected for presentation to the user. The content selection module 330 may also determine the order in which selected content items are presented via the feed. For example, the content selection module 330 orders content items in the feed based on likelihoods of the user interacting with various content items.

The content selection module 330 enforces one or more privacy settings of the users of the online system 140 in various embodiments. A privacy setting of a user determines how particular information associated with a user can be shared, and may be stored in the user profile of a user in the user profile store 305. In one embodiment, a privacy setting specifies particular information associated with a user and identifies other entities with whom the specified information may be shared. Examples of entities with which information can be shared may include other users, applications, third party systems 130, or any entity that can potentially access the information. Examples of information that can be shared by a user include user profile information like profile photo, phone numbers associated with the user, user's connections video data including the user, actions taken by the user such as adding a connection, changing user profile information and the like. In various embodiments, the online system 140 maintains privacy settings associated with a user having a default setting preventing other entities from accessing or from receiving content associated with the user, and allows the user to modify different privacy settings to allow other entities that are specified by the user to access or to retrieve content corresponding to the modified privacy settings.

The privacy setting specification may be provided at different levels of granularity. In one embodiment, a privacy setting may identify specific information to be shared with other users. For example, the privacy setting identifies a phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems 130, specific third party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The content selection module 330 includes logic to determine if certain information associated with a user can be accessed by other users connected to the user via the online system 140, third-party system 130 and/or other applications and entities. Based on the user's privacy settings, the content selection module 330 determines if another user, a third-party system 130, an application or another entity is allowed to access information associated with the user, including information about actions taken by the user. For example, the content section module 330 uses a user's privacy setting to determine if video data including the user may be presented to another user. This enables a user's privacy setting to specify which other users, or other entities, are allowed to receive data about the user's actions or other data associated with the user.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The content selection module 330 includes logic to determine if certain information associated with a user can be accessed by other users connected to the user via the online system 140, third-party system 130 and/or other applications and entities. Based on the user's privacy settings, the content selection module 330 determines if another user, a third-party system 130, an application or another entity is allowed to access information associated with the user, including information about actions taken by the user. For example, the content section module 230 uses a user's privacy setting to determine if video data including the user may be presented to another user. This enables a user's privacy setting to specify which other users, or other entities, are allowed to receive data about the user's actions or other data associated with the user.

The content selection module 330 selects one or more content items for different users of the online system 140 identified in a request for content received from a client device 110. Content items selected for each of the different users are transmitted to the client device 110 from which the received request was received. As further described below in conjunction with FIGS. 4 and 5, the client device 110 generates a feed of content for presentation to the different users from the received content items selected by the content selection module 330 that includes at least one content item selected for each of the different users identified to the content selection module 330.

In various embodiments, the content selection module 330 selects one or more types of content items for each of the different users for transmission to the client device 110 from which the received request was received. For example, the content selection module 330 transmits photographs or other images associated with at least one of the users identified in the request for content or photographs or other images including at least one of the users identified in the request for content. Additionally, the content selection module 330 accounts for information included in the request for content to select one or more content items for different users of the online system 140. In some embodiments, the request for content includes a time, and the content selection module 330 retrieves content from the content store 210 based on the time. For example, the time included in the request specifies a day and the month, and the content selection module 330 retrieves content items associated with the day and the month and associated with a user identified in the request from the content store 210, subject to one or more privacy settings maintained for the user identified in the request. The content selection module 330 may also account for information in a user profile identifying dates specified by a user (e.g., a user's birthday, a user's wedding anniversary, etc.), and when the content selection module 330 receives a request for content from the client device 110 on a date matching a date identified in a user profile of the user, the content selection module 330 retrieves content items associated with the date identified in the user profile of the user in response to receiving the request, subject to one or more privacy settings maintained for the user. actions stored in the action log 320. In other embodiments, the content selection module 330 determines a time range including a time when the request for content was received from the client device 110 and retrieves actions stored in the action log 320 associated with different users identified by the request for content, subject to privacy settings maintained for each user identified by the request for content, associated with times within the time range. Based on actions previously stored in the action log 320 and associated with times within the time range for each of the users identified for the request for content, the content selection module 330 retrieves one or more content items. For example, if the action log 320 includes at least a threshold number of requests for content having a particular topic associated with a user identified by the request for content and associated with times within the time range including the time when the content selection module 330 received the for content, the content selection module 330 retrieves one or more content items associated with the particular topic in response to receiving the request for content identifying the user (e.g., retrieves one or more content items associated with a topic of "news" or retrieves one or more content items associated with a topic of "recipe").

The web server 335 links the online system 140 via the network 120 to the one or more client devices 110, as well as to the one or more third party systems 130. The web server 335 serves web pages, as well as other content, such as JAVA®, FLASH®, XML and so forth. The web server 335 may receive and route messages between the online system 140 and the client device 110, for example, instant messages, queued messages (e.g., email), text messages, short message service (SMS) messages, or messages sent using any other suitable messaging technique. A user may send a request to the web server 335 to upload information (e.g., images or videos) that are stored in the content store 310. Additionally, the web server 335 may provide application programming interface (API) functionality to send data directly to native client device operating systems, such as IOS®, ANDROID™, or BlackberryOS.

Figure 4:
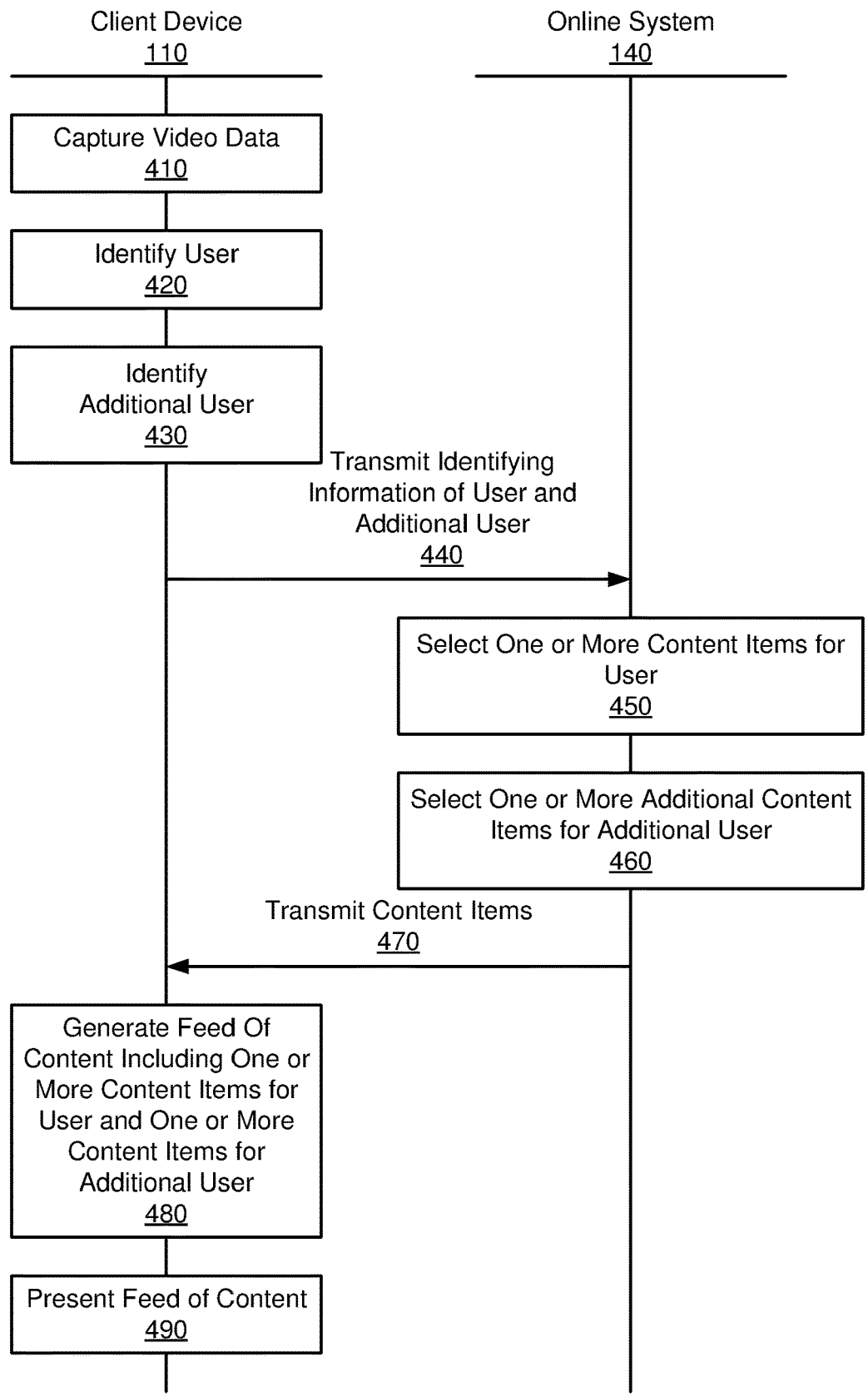
FIG. 4 is an interaction diagram of a method for generating of a feed of content by an online system for presentation by a client device, in accordance with an embodiment.

Generating a Feed of Content Items Selected for Multiple Users Identified by a Client Device FIG. 4 is an interaction diagram of one embodiment of a method for generating a feed of content from content items received by an online system 140 for presentation by a client device 110. In various embodiments, the steps described in conjunction with FIG. 4 may be performed in different orders. Additionally, in some embodiments, the method may include different and/or additional steps than those shown in FIG. 4

The client device 110 includes an image capture device 117, as further described above in conjunction with FIGS. 1 and 2. The image capture device 117 of the client device 110 captures 410 video data or image data of a local area surrounding the receiving client device 110. Images captured by the image capture device 117 are communicated to a controller 210 included in the client device 110 (or coupled to the receiving client device 110 in other embodiments). In various embodiments, the controller 210 applies one or more machine learned models to characteristics of the video captured 410 by the image capture device 117 to locate people included in the captured video data. In various embodiments, the controller 210 applies one or more methods to locate people within the captured video data. The controller 210 may use any suitable model or combination of models to locate people within video data captured 410 by the image capture device 117 of the client device 110. Models applied by the controller 210 to captured video data may perform facial tracking (in two-dimensions or in three-dimensions), two-dimensional pose tracking, three-dimensional pose tracking, or any other suitable method to identify portions of a person's face or portions of the person's body.

From the captured video data and one or more privacy settings maintained by the online system 140 or by the client device 110, the client device 110 identifies 420 a user of the online system 140 included in the captured video data and identifies 430 an additional user of the online system 140 included in the captured video data. In some embodiments, the client device 110 locally maintains information identifying one or more users of the online system 140 and determines measures of similarity of people identified in the captured video data to maintained information identifying one or more users of the online system 140. For example, the client device 110 locally maintains information identifying users of the online system 140 who have previously interacted with the client device 110, for whom the client device 110 received identifying information from the online system 140, of for whom the client device 110 identifying information from another entity. Additionally, the client device 110 obtains and locally maintains privacy settings for users of the online system 140 who have previously interacted with the client device, for whom the client device 110 received identifying information from the online system 140, or for whom the client device 110 received identifying information from another information. The client device 110 identifies 420 a user of the online system 140 for whom the client device 110 obtained a privacy setting authorizing the client device 110 to identify 420 the user and for whom the client device 110 maintains identifying information having at least a threshold measure of similarity to a person identified from the captured video data. Similarly, the client device 110 identifies 430 an additional user of the online system 140 for whom the client device 110 obtained a privacy setting authorizing the client device 110 to identify 430 the additional user and for whom the client device 110 maintains identifying information having at least a threshold measure of similarity to an alternative person identified from the captured video data. In various embodiments, the client device 110 determines the measures of similarity of the user or of additional user by applying a trained model for facial recognition to the captured image data and comparing faces of people identified in the captured video data to stored information identifying the user and the additional user. For example, the trained model crops captured video data or image data to identify faces of people in the captured video data and compares the identified faces from the cropped video data or image data to stored information identifying faces of the user and of the additional user. The client device 110 does not identify 420 users for whom the client device 110 obtains a privacy setting that prohibits identification of users from video data captured 410 by the image capture device 117 of the client device 110.

Alternatively, the receiving client device 110 transmits the captured video data to the online system 140, which includes information identifying various users, as further described above. In some embodiments, the client device 110 includes information identifying people identified within the captured video data by the client device 110 to the online system 140. Alternatively, the online system 140 identifies people within the captured video data by applying one or more of the methods further described above. The online system 140 determines measures of similarity between people identified in the captured video data and information identifying various users using any suitable method or methods. The online system 140 identifies 420 a person identified in the captured video data having at least a threshold measure of similarity to information identifying the user of the online system 140. Similarly, the online system 140 identifies 430 an alternative person identified in the captured video data having at least a threshold measure of similarity to information identifying the additional user of the online system 140. The online system 140 transmits information identifying the user and the additional user to the client device 110.

When identifying users included in video data received from the client device 110, the online system 140 enforces privacy settings maintained by the online system 140 for various users. Hence, if the online system 140 maintains a privacy setting that authorizes the online system 140 to identify the user from video data received from a client device 110, the online system 140 compares people identified in the video data received from the client device 110 to information identifying the user, allowing the online system 140 to determine whether the video data includes the user. However, if the online system 140 maintains an alternative privacy setting for the user that does not authorize the online system 140 to identify the user from video data captured by the client device, the online system 140 does not compare people identified in the video data received from the client device 110 to information identifying the user. In some embodiments, a privacy setting maintained by the online system 140 for a user includes identifiers of specific client devices 110, so if the online system 140 receives video data from a client device 110 having an identifier matching an identifier specified by the privacy setting maintained by the user, the online system 140 compares people identified from video data received from the client device 110 to information maintained by the online system 140 identifying the user. However, if the online system 140 receives video data from an alternative client device 110 having an identifier that does not match at least one identifier specified by the privacy setting maintained by the user, the online system 140 does not compare people identified from video data received from the alternative client device 110 to information maintained by the online system 140 identifying the user. Alternatively or additionally, a privacy setting maintained by the online system 140 for the user maintains an exclusion list of identifiers of client devices 110, so the online system 140 does not compare people identified from video data received from a client device 110 having an identifier included on the exclusion list to information maintained by the online system 140 that identifies the user; however, in the preceding embodiment, the online system 140 may compare information identifying the user to people identified from video data received from a client device 110 having an identifier that is not included on the exclusion list. Hence, the online system 140 enforces one or more privacy settings maintained by the online system 140 for the user and for the additional user when identifying 420 the user and when identifying 430 the additional user from video data received from the client device 110.

The client device 110 or the online system 140 may use other information obtained by the client device 110 to identify 420 the user and to identify 430 the additional user, subject to privacy settings maintained for the user and for the additional user. For example, the client device 110 includes one or more audio capture devices. The client device 110 or the online system 140 compares captured audio data to stored audio data identifying the user or identifying the additional user, provided the user or the additional user have authorized to be identified from audio data. Responsive to the captured audio data having at least a threshold measure of similarity to stored audio data identifying the user, the client device 110 or the online system 140 identifies 420 the user; similarly, the client device 110 or the online system 140 identifies 430 the additional user responsive to the captured audio data having at least a threshold measure of similarity to stored audio data identifying the user, the client device 110 or the online system 140 identifies 430 the additional user. In other embodiments, the client device 110 or the online system 140 identifies 420 the user or identifies 430 the additional user via any suitable information obtained by the client device 110. For example, the user or the additional user authorizes an additional device to provide information identifying the user or the additional user to the client device 110.

The client device 110 transmits 440 a request for content items to the online system 140 that includes information identifying the user and the additional user to the online system 140. For example, the request includes an identifier associated with the user by the online system 140 and an additional identifier associated with the additional user by the online system 140. However, in other embodiments, the request includes any suitable information identifying the user and identifying the additional user to the online system 140. In some embodiments, the request may include criteria for selecting content. For example, the request identifies a number of content items to select, and may specify a number of content items for the user and a number of content items for the additional user. In another example, the client device 110 may have certain content restrictions such that the client device 110 would include such content restrictions within the request. In some embodiments, the client device 110 transmits 440 the request in response to receiving an input from the user or from the additional user. Alternatively, the client device 110 transmits 440 the request based on one or more settings stored in association with the user or in association with the additional user.

In response to receiving the request, the online system 140 selects 450 one or more content items for the user and selects 460 one or more content items for the additional user. In some embodiments, the online system 140 determines measures of relevance of various content items to the user based on characteristics of the user and characteristics of the content items and selects 450 content items for the user based on the measures of relevance. Similarly, the online system 140 determines measures of relevance of various content items to the additional user based on characteristics of the additional user and characteristics of the content items and selects 460 additional content items for the additional user based on the measures of relevance. Selection of content items is further described above in conjunction with FIG. 3. When selecting 450 the content items for the user and selecting 460 the content items for the additional user, the online system 140 accounts for one or more criteria included in the request. For example, if the request specifies a number of content items for the user and number of content items for the additional user, the online system 140 selects 450 the number of content items for the user and selects 460 the number of content items for the additional user.

The online system 140 transmits 470 the content items selected 450 for the user and the additional content items selected 460 for the additional user to the client device 110. From the content items selected 450 for the user and the additional content items selected 460 for the additional user, the client device 110 generates 480 a feed of content including at least one content item selected 450 for the user and at least one additional content item selected 460 for the additional user. The client device 110 subsequently presents 490 the feed of content via the display device 115. When generating 480 the feed of content, the client device 110 determines an order in which content items received from the online system 140 are presented. In some embodiments, the order is based on likelihoods of the user or the additional user interacting with different content items and additional content items, so the client device 110 orders the one or more content items and the one or more additional content items included in the feed to maximize an overall likelihood of interaction with the feed. Additionally, in some embodiments, the online system 140 maintains one or more diversity criteria specifying numbers of content items or additional content items included in the feed and generates 480 the feed of content subject to the one or more diversity criteria. For example, one or more diversity criteria specify a minimum number of content items and a minimum number of additional content items included in the feed of content and generates 480 the feed of content so at least the minimum number of content items and at least the minimum number of additional content items are included in the feed of content. In other embodiments, the client device 110 maintains any suitable diversity criteria regulating content items or additional content included in the feed of content and generates 480 the feed of content subject to the one or more diversity criteria.

In some embodiments, the client device 110 accounts for settings or preferences maintained for the user and for the additional user. For example, the settings or preferences for the user and for the additional user are included in user profiles maintained for the user and for the additional user. The client device 110 may receive a user profile maintained by the online system 140 for the user and an additional user profile maintained by the online system 140 for the additional user when the online system 140 receives information identifying the user and identifying the additional user in some embodiments. Alternatively, the client device 110 transmits portions of the user profile of the user and of the additional user profile of the additional user to the client device 110, subject to privacy settings maintained for the user and for the additional user, when transmitting 470 the content items selected 450 for the user and when transmitting 480 the content items selected 460 for the additional user, respectively. In other embodiments, the client device 110 locally stores settings or preferences for the user and for the additional user in association with information identifying the user and identifying the additional user, provided privacy settings maintained for the user and for the additional user authorize the client device 110 to locally store the settings, preferences, or information identifying the user or the additional user; this allows the user or the additional user to maintain local settings describing or modifying how the client device 110 generates 480 the feed of content.

The client device 110 may also account for prior interaction with the client device 110 by the user and by the additional user when generating 480 the feed, subject to privacy settings maintained for the user and for the additional user. For example, if a privacy setting maintained for the user (or for the additional user) authorizes the client device 110 to store information describing interaction by the user with the client device 110 or for the online system 140 to store information describing interaction by the user with the client device 110 received from the client device 110 and another privacy setting maintained for the user authorizes the client device 110 to access the stored information describing prior interaction by the user with the client device 110, the client device 110 generates one or more content items including recommendations for using the client device 110. As an example, based on stored information identifying interaction with the client device 110 by the user, the client device 110 generates a content item identifying a modification to a setting of a component of the content item or generates a content item identifying a functionality of the client device 110 that the user has not previously used within a specific time interval. The client device 110 includes the content item in the generated feed. However, if a privacy setting maintained for the user does not authorize the client device 110 to store information describing interaction with the client device 110 or to access stored information describing interaction with the client device 110, the client device 110 does not access information describing prior interaction with the client device 110 by the user, so the client device 110 does not generate a content item for inclusion in the generated feed describing modification to a setting of the client device 110 or functionality of the client device 110. When identifying a modification to a setting or a functionality of the client device 110, the client device 110 may account for settings of the client device 110 at the time the feed is generated 480, as well as functionality provided by the client device 110 when the feed is generated 480. For example, the client device 110 excludes content items from the generated feed that describe functionality of the client device 110 used when the feed is generated 480 (e.g., if the client device 110 is playing audio data when the feed is generated 480, content items identifying that the client device 110 is capable of playing audio data are not included in the generated feed).

In some embodiments, the client device 110 maintains a setting for the user that prevents presentation of content for the user by the client device 110 when video data or image data captured 410 by the client device 110 includes at least one person other than the user and maintains an alternative setting for the additional user authorizing the client device 110 to present content for the additional user when the client device 110 captures 410 video data including one or more people other than the additional user. In the preceding example, the client device 110 generates 480 the feed of content to include additional content items selected 450 for the additional user but not including content items selected 460 for the additional user. In some embodiments, a setting maintained for the user authorizes the client device 110 to present content for the user when video data or image data captured 410 by the client device 110 includes specific other users for whom the setting includes identifying information. In response to determining information identifying the other user matches (or has at least a threshold measure of similarity) with information identifying a specific other user included in the setting, the client device 110 generates 480 the feed of content to include content items selected 450 for the user and additional content items selected 460 for the additional user. As another example, the client device 110 maintains a setting for the user specifying a time interval during which content for the user is authorized to be presented when one or more other people are included in the video data captured 410 by the client device 110; accordingly, the client device 110 includes content items selected 450 for the user in the feed of content when generating 480 the feed within the specified time interval and does not include content items selected 450 for the user when generating 480 the feed at times outside of the specified time interval. The client device 110 similarly accounts for similar settings maintained for the additional user when generating 480 the feed of content.

Additionally, the client device 110 maintains a setting specifying one or more criteria for including content items in the generated feed. For example, the setting identifies an event, so the client device 110 includes content items from the online system 140 that are associated with or identify the event, causing the feed of content to include content items (e.g., photographs, videos, stories) associated with (or otherwise identifying) the event. The user or the additional user may specify the setting, allowing the user or the additional user to influence the content items included in the feed. The client device 110 may bias the generated feed to include a greater number of content items having at least a threshold amount of the criteria specified by the setting. For example, the client device 110 includes at least a threshold number of content items satisfying the one or more criteria specified by the setting or generates 480 the feed so that at least a threshold percentage of content items included in the feed satisfy one or more of the criteria specified by the setting. Any suitable criteria may be specified by the setting and used to identify content items for inclusion in the feed. Example criteria include: an identifier of an event, an identifier of a date, an identifier of a time, an identifier of a topic, an identifier of an object maintained by the online system 140, and any other suitable information identifying one or more characteristics of content items.

In various embodiments, the client device 110 determines likelihoods of the user interacting with content items selected 450 for the user by the online system 140 and similarly determines likelihoods of the additional user interacting with additional content items selected 460 for the additional user by the online system 140. The client device 110 generates 440 the feed of content based on the likelihoods of the user or the additional user interacting with various additional content items received from the online system 140. In one embodiment, the client device 110 identifies content items selected 450 for the user with which the user has at least a threshold likelihood of interacting and identifies additional content items selected 460 for the additional user with which the user has at least the threshold likelihood of interacting. Alternatively, the client device 110 generates a ranking of content items selected 450 of the user based on the likelihoods of the user interacting with the content items selected 450 for the user and generates an additional ranking of additional content items selected 460 for the additional user based on the likelihoods of the additional user interacting with the additional content items selected 460 for the additional user. The client device 110 generates 480 the feed of content by selecting content items having at least a threshold position in the ranking and additional content items having at least a threshold position in the additional ranking. In various embodiments, the client device 110 may determine likelihoods of the user or of the additional user interacting with content items based on information from the online system 140 describing prior interactions with content by the user and by the additional user. As another example, the client device 110 generates a combined ranking of content items selected 450 for the user and additional content items selected 460 for the additional user and selects content items having at least a threshold position in the ranking for the feed of content. Alternatively, the client device 110 determines measures of relevance to the user of various content items selected 450 for the user by the online system 140 and similarly determines measures of relevance to the additional user of various additional content items selected 460 for the additional user by the online system 140, as further described above in conjunction with FIG. 3. The client device 110 generates 480 the feed of content based on the measures of relevance using methods similar to those described above regarding likelihoods of interaction with content items (e.g., selecting content items from a combined ranking based on measures of relevance for content items selected 450 of the user and for content items selected 460 for the additional user, selecting content items from separate rankings for the user and for the additional user based on measures of relevance).

In an additional embodiment, the client device 110 trains a model to generate 480 the feed of content based on prior interactions with content items by the user and by the additional user. For example, when the user or the additional user interacts with or views a presented content item, the client device 110 extracts one or more characteristics of the presented content item (e.g., one or more topics, a user associated with the presented content item, an object maintained by the online system 140 associated with the presented content item, etc.). The client device 110 determines weights for one or more of the extracted characteristics of the presented content item and stores the weights in association with their corresponding extracted characteristics. When generating 480 the feed of content, the client device 110 extracts characteristics from the content items and from the additional content items and applies weights to characteristics extracted from the content items and from the additional content items matching stored characteristics associated with the weights. The client device 110 determines values for each of the content items and the additional content items based on the applied weights; for example, a value for a content item is a sum of the weights of characteristics extracted from the content item. To generate 480 the feed of content, the client device 110 selects content items or additional content items having at least a threshold value. In other embodiments, the client device 110 ranks the content items and the additional content items based on their values and generates 480 the feed of content to include content items or additional content items having at least a threshold position in the ranking. The client device 110 locally stores the model in various embodiments, and may modify weights associated with different characteristics extracted from content items based on characteristics of content items viewed by the user or by the additional user or interactions with content items by the user or by the additional user. In some embodiments, the client device 110 decreases a weight associated with a characteristic extracted from a content item if the user or the additional user performs certain interactions with the content item (e.g., dismisses the content item, submits a complaint to the online system 140 identifying the content item). Additionally, the client device 110 may apply a decay factor to weights that attenuates a weight as a time interval from a current time to a time when a content item having a characteristic corresponding to the weight was viewed by, or interacted with, the user or the additional user.

The client device 110 may account for other information captured by the client device 110 when generating 480 the feed of content in various embodiments. For example, the client device 110 includes one or more audio capture devices configured to capture audio data from an environment including the client device 110. The client device 110 may transmit portions of the captured audio data to the online system 140, provided such transmission is authorized by privacy settings maintained for the user and for the additional user. Based on the portions of the captured audio data, the online system 140 identifies an object corresponding to one or more portions of the captured audio data and transmits content items associated with the identified object to the client device 110, which includes the content items corresponding to the portions of the captured audio data in the feed. For example, the online system 140 identifies a television program corresponding to a portion of the audio data from the client device 110 and transmits content items associated with the television program to the client device 110, allowing the client device 110 to augment the television program by presenting related content. Similarly, the client device 110 may transmit portions of video data captured by the image capture device 117 to the online system 140, provided such transmission is authorized by privacy settings maintained for the user and for the additional user. Based on the portions of the video data, the online system 140 identifies an object corresponding to one or more portions of the video data and transmits content items associated with an identified object to the client device 110, which includes the one or more content items associated with the identified object in the generated feed. The client device 110 may include the portions of the audio data or the video data in the The client device 110 may account for a time when the content items were received or a time when the request identifying the user and the additional user was transmitted 440 to the online system 140 when generating 480 the feed. For example, the client device 110 determines whether a date when the information identifying the user and the additional user matches a date identified by a user profile of the user or by a user profile of the additional user (e.g., a birthday, a wedding anniversary, etc.), subject to one or more privacy settings of the user or of the additional user, as further described above. If the date when the information identifying the user or identifying the additional user matches a date identified by a user profile of the user or of the additional user, subject to privacy settings for the user or for the additional user, the client device 110 includes content items associated with the date identified in the user profile of the user or of the additional user in the generated feed, subject to privacy settings maintained for the user or for the additional user. In other embodiments, the client device 110 accounts for prior interactions by the user or by the additional user with the client device 110 during a time range when the request identifying the user and the additional user was transmitted was transmitted 440 to the online system 140, subject to privacy settings maintained for the user and for the additional user, as further described above. For example, based on prior interactions with the client device 110 stored by the client device 110 or by the online system 140, the client device 110 retrieves stored interactions by the user (or by the additional user) with the client device 110 associated with times within a time range including a time when the client device 110 transmitted 440 the request identifying the user and the additional user, or retrieves stored interactions by the user (or by the additional user) associated with times within a time range including a time when the client device 110 received content items from the online system 140, provided that privacy settings maintained for the user or for the additional user authorize the client device 110 to retrieve interactions maintained for the user or for the additional user. Based on the retrieved interactions previously stored in the action log 320 and associated with times within the time range for the user or for the additional user, the client device 110 obtains one or more content items based on characteristics of the retrieved interactions. For example, if the retrieved interactions include at least a threshold number of requests for content having a particular topic associated with the and associated with times within the time range including the time when the client device 110 transmitted 440 the request to the online system 140, the client device 110 obtains one or more content items associated with the particular topic in response to receiving the request for content identifying the user (e.g., retrieves one or more content items associated with a topic of "news" or retrieves one or more content items associated with a topic of "recipe"). The client device 110 may store information identifying different time ranges, or the online system 140 may store information identifying the different time ranges. In some embodiments, the online system 140 or the client device 110 stores different time ranges in association with the user and with the additional user, allowing the client device 110 to further personalize content included in the generated feed based on different usage patterns of the client device 110 by the user and by the additional user.

As another example the client device 110 extracts topics from various content items and additional content items received from the online system 140. The client device 110 generates a set of topics including topics extracted from content items selected 450 for the user and generates an additional set of topics including topics extracted from additional content items selected 460 for presentation to the additional user. For each of at least a set of content items, the online system 140 determines a score based on an amount (e.g., a percentage, a number) of topics extracted from a content item of the set matching topics of the additional set of topics. Similarly, for each of at least a set of additional content items, the online system 140 determines a score based on an amount (e.g., a percentage, a number) of topics extracted from an additional content item of the set matching topics of the set of topics. The client device 110 may normalize the scores for the content items and the scores for the additional content items to account for differences in numbers of topics extracted from different content items and additional content items. Based on the scores for the content items and for the additional content items, the client device 110 generates a ranking of the content items and the additional content items. To generate 480 the feed of content, the client device 110 selects content items or additional content items having at least a threshold position in the ranking.

In various embodiments, when generating 480 the feed of content, the client device 110 includes content items from one or more third party systems 130 or from applications executing on the client device 110. For example, the client device 110 retrieves content from one or more third party systems 130 associated with applications executing on the client device 110, or from the applications executing on the client device 110, and evaluates content items from the one or more third party systems 130, or from the applications executing on the client device 110, when generating 480 the feed of content. In some embodiments, the client device 110 accounts for frequencies with which the user or the additional user interact with an application executing on the client device 110 and associated with a third party system 130 to increase a likelihood of the generated feed including content items from the third party system 130 or from the application executing on the client device 110, provided one or more privacy settings maintained by the online system 140 or the client device for the user or for the additional user authorize the client device 110 to store information describing interaction by the user or by the additional user with applications executing on the client device 110 and to subsequently access stored information describing interaction by the user or by the additional user with applications executing on the client device 110. For example, a content item retrieved from a third party system 130 associated with an application executing on the client device 110, or from the application executing on the client device, with which the user more frequently interacts has a greater likelihood of being included in the generated feed than another content item retrieved from another third party system 130 associated with another application executing on the client device 110, or retrieved from the other application executing on the client device, with which the user less frequently interacts.

Additionally, the client device 110 includes information identifying contacts maintained for the user and for the additional user in the generated feed in some embodiments. The online system 140 maintains a listing of contacts for the user that includes information identifying one or more other users and information for contacting each of the other users (e.g., a phone number, an e-mail address, etc.). Similarly, the online system 140 maintains an additional listing of contacts for the additional user that includes information identifying one or more other users and information for contacting each of the other users (e.g., a phone number, an e-mail address, etc.). In various embodiments, the listing of contacts is included in a user profile the online system 140 maintains for the user, and the additional listing of contacts is included in a user profile the online system 140 maintains for the user. Additionally or alternatively, the list of contacts for the user is maintained by the client device 110 in association with information identifying the user, and the additional list of contacts for the additional user is maintained by the client device 110 in association with information identifying the additional user. If privacy settings maintained for the user and for the additional user authorize the client device 110 to access the list of contacts and the additional list of contacts, the client device 110 accesses the list of contacts and the additional list of contacts and generates a combined contact listing that includes at least one contact maintained for the user and at least one contact maintained for the additional user. Subsequently, the combined contact listing is included in the generated feed of content. The client device 110 may use any suitable information to generate the combined contact listing. For example, the combined contact listing includes contacts who the user contacted at least a threshold number of times or contacted with at least a threshold frequency and contacts who the additional user contacted at least the threshold number of times or with at least the threshold frequency (provided privacy settings maintained for the user and for the additional user authorize the client device 110 to access stored actions identifying use of the listing of contacts or of the additional listing of contacts by the user or by the additional user, respectively). The combined contact listing includes also configuration information corresponding to establishing communications with a contact of the user or with a contact of the additional user. For example, the combined contact listing includes audio or visual effects specified by the user for communicating with another user in the list of contacts or audio or visual effects (e.g., a sound effect to identify a communication to or from the other user, a visual indication of a communication to or from the other user, etc.) specified by the additional user for communicating with another in the additional list of contacts.

In various embodiments, when the client device 110 receives an interaction with a content item of the feed of content, the client device 110 determines distances between the client device 110 and the user and between the client device 110 and the additional user when the interaction was received. If the distance between the client device 110 and the user is less than the distance between the client device 110 and the additional user, the client device 110 determines that the user interacted with the content item. The client device 110 subsequently stores information identifying the content item in association with information identifying the user, and may provide an indication to the online system 140 identifying the user, the content item, and the interaction with the content item by the user. Conversely, if the distance between the client device 110 and the additional user is less than the distance between the client device 110 and the user, the client device 110 determines that the additional user interacted with the content item. The client device 110 subsequently stores information identifying the content item in association with information identifying the additional user, and may provide an indication to the online system 140 identifying the additional user, the content item, and the interaction with the content item by the additional user. The online system 140 or the client device 110 may account for content items or additional content items when subsequently selecting content for the user or for the additional user or when generating 480 a subsequent feed of content. For example, the client device 110 removes content items or additional content items with which the user or the additional user previously interacted from a subsequent feed of content.

In some embodiments, the client device 110 may determine an amount of time content items or additional content items of the feed are presented while the user or the additional user is included in the captured video data. The client device 110 stores information indicating a content item or an additional content item of the feed of content was presented to the user if the content item or the additional content item was presented by the client device 110 for at least a threshold amount of time while the user was within the captured video data. Similarly, the client device 110 stores information indicating a content item or an additional content item of the feed of content was presented to the additional user if the content item or the additional content item was presented by the client device 110 for at least a threshold amount of time while the additional user was within the captured video data. The client device 110 may provide information to the online system 140 identifying content items or additional content items determined to have been presented to the user or to have been presented to the additional user. The online system 140 or the client device 110 may account for content items or additional content items presented to the user or to the additional user when generating a subsequent feed of content; for example, the client device 110 does not include content items or additional content items determined to have previously been presented to the user or to the additional user.

While FIG. 4 describes generation of a feed based on the user and the additional user, the client device 110 may generate or modify other content based on the user and the identified additional user. For example, the client device 110 obtains (e.g., from local storage or from the online system 140) content particular to the user and to the additional user. For example, the client device 110 obtains visual or audio effects (e.g., video filters, video overlays, audio effects) maintained for the user and for the additional user and applies the corresponding visual or audio effect to actions by the user or the additional user or to content for the user or the additional user. For example, the client device 110 determines that the user is initiating an audio or video call via the client device 110 and applies audio or video effects maintained for the user to the audio or video call; similarly, when the client device 110 determines that the additional user is initiating an audio or video call via the client device 110, the client device 110d applies audio or video effects maintained for the additional user to the audio or video call.

Figure 5:
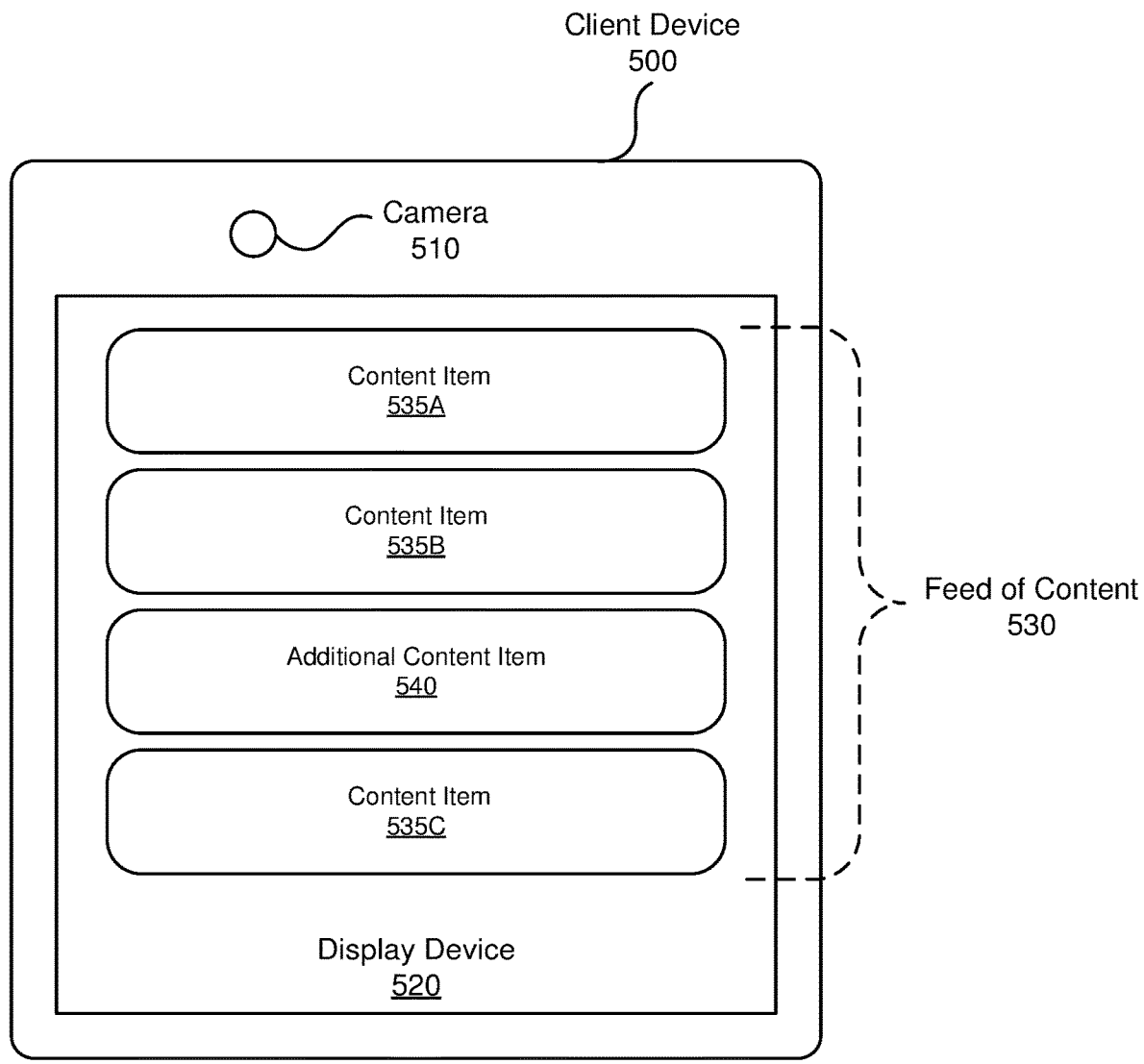
FIG. 5 is an illustration of a client device including a display with a feed of content, in accordance with an embodiment.

FIG. 5 is an example a client device 500 including a display device 520 presenting a feed of content 530. The client device 500 shown in FIG. 5 is an embodiment of the client device 110 with the camera 510 and the display device 520 as embodiments of the image capture device 117 and the display device 115, respectively. As described above in conjunction with FIGS. 2 and 4, the camera 510 captures video data or image date of a local area surrounding the client device 110. From the captured image data or video data, the client device 500 identifies a user and an additional user of an online system 140, as further described above in conjunction with FIGS. 2 and 4. The client device 500 sends identifying information the user and the additional user to the online system 140, which selects content items for presentation to the user and additional content items for presentation to the additional user, as further described above in conjunction with FIGS. 3 and 4.

From the content items and the additional content items received from the online system 140, the client device 500 generates the feed of content 530 and presents the feed of content 530 via the display device 520. In the example shown by FIG. 5, the feed of content 530 includes content items 535A, 535B, 535C selected for presentation to the user and additional content item 540 selected for presentation to the additional user. Subject to one or more settings stored by the client device 110 for the user or for the additional user, the client device 550 generates the feed of content 530 to include at least one content item 535A, 535B, 535C selected for the user and at least one additional content item 540 selected for the additional user. As further described above in conjunction with FIG. 4, the client device 110 may account for interactions with content items by the user or by the additional user with previously presented content items when generating the feed of content 530. For example, the client device 110 locally maintains a model trained based on content items previously viewed by or interacted with by the user or the additional user and generates the feed of content 530 by applying the model to content items and additional content items received from the online system 140. Including one or more content items 535A, 535B, 525C and one or more additional content items 540 in the feed of content 530 allows both the user and the additional user to more easily view content selected by the online system 140 via the client device 500.

While FIG. 5 shows an example where the feed of content 530 concurrently presents multiple content items 535A, 535B, 535C selected for presentation to the user and the additional content item 540, in other embodiments, the feed of content 530 presents a single content item from content items 535A, 535B, 535C and additional content item 540 at one time, and subsequently presents an alternative content item from content items 535A, 535B, 535C and additional content item 540 in response to the client device 500 receiving an input. For example, the client device 500 obtains pages corresponding to content items 535A, 535B, 535C and additional content item 540 and orders the pages corresponding to content items 535A, 535B, 535C and additional content item 540. The client device 500 presents a single page corresponding to a selected one of content items 535A, 535B, 535C and additional content item 540, while not presenting the other pages corresponding to non-selected content items 535A, 535B, 535C and additional content item 540. After receiving an input, the client device 500 selects an alternative content item of content items 535A, 535B, 535C and additional content item 540 and presents the page corresponding to the alternative content item without presenting pages corresponding to other content items 535A, 535B, 535C and additional content item 540. Hence, the client device 500 sequentially presents individual content items from the feed of content 530 in some embodiments, allowing the user and the individual user to interact with the client device 500 to view different content items from the feed of content 530.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    capturing video data of a local area within a field of view of an image capture device included in a client device;
    identifying a user of an online system included in the captured video data;
    identifying an additional user of the online system included in the captured video data;
    transmitting a request for content items for presentation on the client device to the online system from the client device, the request including information identifying the user of the online system and information identifying the additional user from the client device to the online system;
    receiving, at the client device, one or more content items from the online system, each content item selected by the online system for presentation to the user;
    receiving, at the client device, one or more additional content items from the online system, each content item selected by the online system for presentation to the additional user;
    generating, by the client device, a feed of content including one or more of the content items selected by the online system for presentation to the user and one or more of the additional content items selected by the online system for presentation to the additional user based on characteristics of the content items and of the additional content items; and
    presenting the feed of content by a display device of the client device.

2. The method of claim 1, wherein the information identifying the user comprises an identifier associated with the user by the online system and wherein the information identifying the additional user comprises an additional identifier associated with the additional user by the online system.

3. The method of claim 1, wherein identifying the user of the online system included in the captured video data comprises:
    identifying a person in the captured video data;
    retrieving information identifying one or more users of the online system stored by the client device and privacy settings maintained for each of the one or more users; and
    identifying the user of the online system as a user associated with identifying information stored by the online system having at least a threshold measure of similarity to the person in response to a privacy setting maintained for the user authorizing identification of the user from the captured video data.

4. The method of claim 1, wherein identifying the additional user of the online system included in the captured video data comprises:
    identifying a person in the captured video data;
    retrieving information identifying one or more users of the online system stored by the client device and privacy settings maintained for each of the one or more users; and
    identifying the additional, user of the online system as a user associated with identifying information stored by the online system having at least a threshold measure of similarity to the person in response to a privacy setting maintained for the user authorizing identification of the user from the captured video data.

5. The method of claim 1, wherein generating, by the client device, the feed of content including one or more of the content items selected by the online system for presentation to the user and one or more of the additional content items selected by the online system for presentation to the additional user comprises:
   retrieving one or more settings maintained by the client device for the user; and
   responsive to a setting maintained by the client device for the user authorizing the client device to present content for the user when the captured video data includes at least one user other than the user, generating the feed of content including one or more of the content items selected by the online system for presentation to the user and one or more of the additional content items selected by the online system for presentation to the additional user.

6. The method of claim 1, wherein generating, by the client device, the feed of content including one or more of the content items selected by the online system for presentation to the user and one or more of the additional content items selected by the online system for presentation to the additional user comprises:
   determining a time range including a time when the client device transmitted the request to the online system;
   determining prior interactions by the user with the client device within the time range;
   selecting one or more content items for inclusion in the feed based on one or more characteristics of the prior interactions by the user with the client device.

7. The method of claim 1, wherein generating, by the client device, the feed of content including one or more of the content items selected by the online system for presentation to the user and one or more of the additional content items selected by the online system for presentation to the additional user based on characteristics of the content items and of the additional content items comprises:
   generating the feed of content subject to one or more diversity criteria maintained by the client device.

8. The method of claim 7, wherein the one or more diversity criteria specify a minimum number of content items in the feed of content and a minimum number of additional content items in the feed of content.

9. The method of claim 1, wherein generating, by the client device, the feed of content including one or more of the content items selected by the online system for presentation to the user and one or more of the additional content items selected by the online system for presentation to the additional user comprises:
   retrieving a listing of contacts maintained for the user;
   retrieving an additional listing of contacts maintained for the additional user;
   generating a combined contact listing including at least one contact maintained for the user and at least one contact maintained for the additional user; and
   including the combined contact listing in the feed of content.

10. The method of claim 1, wherein generating, by the client device, the feed of content including one or more of the content items selected by the online system for presentation to the user and one or more of the additional content items selected by the online system for presentation to the additional user comprises:
    retrieving a setting maintained by the client device for the user, the setting specifying one or more criteria for content items presented by the feed of content; and
    generating the feed to include at least a threshold amount of content items having characteristics satisfying at least a threshold amount of the one or more criteria specified by the setting.

11. The method of claim 10, wherein the one or more criteria for the content items presented by the feed of content are selected from a group consisting of: an identifier of an event, an identifier of a date, an identifier of a time, an identifier of a topic, an identifier of an object maintained by the online system, and any combination thereof.

12. A computer program product comprising a non-transitory computer-readable storage medium with encoded instructions that, when executed by a processor, cause the processor to:
    capture video data of a local area within a field of view of an image capture device included in a client device;
    identify a user of an online system included in the captured video data;
    identify an additional user of the online system included in the captured video data;
    transmit a request for content items for presentation on the client device to the online system from the client device, the request including information identifying the user of the online system and information identifying the additional user from the client device to the online system;
    receive, at the client device, one or more content items from the online system, each content item selected by the online system for presentation to the user;
    receive, at the client device, one or more additional content items from the online system, each content item selected by the online system for presentation to the additional user;
    generate, by the client device, a feed of content including one or more of the content items selected by the online system for presentation to the user and one or more of the additional content items selected by the online system for presentation to the additional user based on characteristics of the content items and of the additional content items; and
    present the feed of content by a display device of the client device.

13. The computer program product of claim 12, wherein the information identifying the user comprises an identifier associated with the user by the online system and wherein the information identifying the additional user comprises an additional identifier associated with the additional user by the online system.

14. The computer program product of claim 12, wherein identify the user of the online system included in the captured video data comprises:
    identify a person in the captured video data;
    retrieve information identifying one or more users of the online system stored by the client device and privacy settings maintained for each of the one or more users; and
    identify the user of the online system as a user associated with identifying information stored by the online system having at least a threshold measure of similarity to the person in response to a privacy setting maintained for the user authorizing identification of the user from the captured video data.

15. The computer program product of claim 12, wherein identify the additional user of the online system included in the captured video data comprises:

identify a person in the captured video data;
retrieve information identifying one or more users of the online system stored by the client device and privacy settings maintained for each of the one or more users; and
identify the additional, user of the online system as a user associated with identifying information stored by the online system having at least a threshold measure of similarity to the person in response to a privacy setting maintained for the user authorizing identification of the user from the captured video data.

16. The computer program product of claim 12, wherein generate, by the client device, the feed of content including one or more of the content items selected by the online system for presentation to the user and one or more of the additional content items selected by the online system for presentation to the additional user comprises:
retrieve one or more settings maintained by the client device for the user; and
responsive to a setting maintained by the client device for the user authorizing the client device to present content for the user when the captured video data includes at least one user other than the user, generate the feed of content including one or more of the content items selected by the online system for presentation to the user and one or more of the additional content items selected by the online system for presentation to the additional user.

17. The computer program product of claim 12, wherein generate, by the client device, the feed of content including one or more of the content items selected by the online system for presentation to the user and one or more of the additional content items selected by the online system for presentation to the additional user comprises:
determine a time range including a time when the client device transmitted the request to the online system;
determine prior interactions by the user with the client device within the time range;
select one or more content items for inclusion in the feed based on one or more characteristics of the prior interactions by the user with the client device.

18. The computer program product of claim 12, wherein generate, by the client device, the feed of content including one or more of the content items selected by the online system for presentation to the user and one or more of the additional content items selected by the online system for presentation to the additional user based on characteristics of the content items and of the additional content items comprises:
generate the feed of content subject to one or more diversity criteria maintained by the client device.

19. The computer program product of claim 18, wherein the one or more diversity criteria specify a minimum number of content items in the feed of content and a minimum number of additional content items in the feed of content.

20. The computer program product of claim 12, wherein generate, by the client device, the feed of content including one or more of the content items selected by the online system for presentation to the user and one or more of the additional content items selected by the online system for presentation to the additional user comprises:
retrieve a listing of contacts maintained for the user;
retrieve an additional listing of contacts maintained for the additional user;
generate a combined contact listing including at least one contact maintained for the user and at least one contact maintained for the additional user; and
include the combined contact listing in the feed of content.

21. The computer program product of claim 12, wherein generate, by the client device, the feed of content including one or more of the content items selected by the online system for presentation to the user and one or more of the additional content items selected by the online system for presentation to the additional user comprises:
retrieve a setting maintained by the client device for the user, the setting specifying one or more criteria for content items presented by the feed of content; and
generate the feed to include at least a threshold amount of content items having characteristics satisfying at least a threshold amount of the one or more criteria specified by the setting.

22. The computer program product of claim 21, wherein the one or more criteria for the content items presented by the feed of content are selected from a group consisting of: an identifier of an event, an identifier of a date, an identifier of a time, an identifier of a topic, an identifier of an object maintained by the online system, and any combination thereof.

* * * * *